United States Patent [19]

Tschurbanoff

[11] Patent Number: 4,583,700
[45] Date of Patent: Apr. 22, 1986

[54] CABLE WINDING SYSTEM FOR ELECTRICALLY POWERED MINE VEHICLES

[76] Inventor: Aleksei Tschurbanoff, Krööpilänkatu 3C 17, 20610 Turku 61, Finland

[21] Appl. No.: 636,154

[22] Filed: Jul. 31, 1984

Related U.S. Application Data

[63] Continuation-in-part of Ser. No. 392,024, Jun. 25, 1982, abandoned.

[30] Foreign Application Priority Data

Jul. 3, 1981 [FI] Finland ................................. 812108

[51] Int. Cl.⁴ ...................... B65H 75/38; H02G 11/00
[52] U.S. Cl. ............................... 242/86.51; 191/12.2 R
[58] Field of Search ................ 242/86.51, 86.5, 86.52, 242/54, 55, 67.1, 75.3, 76, 86.61, 157 R

[56] References Cited

U.S. PATENT DOCUMENTS

| | | | |
|---|---|---|---|
| Re. 30,727 | 9/1981 | Chong | 242/105 |
| 1,092,714 | 4/1914 | Holmes | 254/397 |
| 1,351,367 | 8/1920 | Bowman | 254/397 |
| 2,589,217 | 3/1952 | Ball | 242/86.51 |
| 2,690,884 | 10/1954 | Beck | 242/86.51 |
| 2,754,011 | 7/1956 | Maki | 254/398 |
| 3,889,896 | 6/1975 | O'Hara | 242/86 |

Primary Examiner—Stuart S. Levy
Assistant Examiner—Lloyd D. Doigan
Attorney, Agent, or Firm—Ralf H. Siegemund

[57] ABSTRACT

A cable winding mechanism for electrically powered underground vehicles is disclosed wherein an extension arm for guiding the cable is mounted for free swiveling and carries the reeling motor having its drive shaft arranged concentrically to the axle of the swivel arm and drivingly connected to a cable reeling drum or the like.

4 Claims, 5 Drawing Figures

CABLE WINDING SYSTEM FOR ELECTRICALLY POWERED MINE VEHICLES

This application is a continuation-in-part application, of application Ser. No. 392,024, filed June 25, 1982, now abandoned.

BACKGROUND OF THE INVENTION

The present invention relates to a cable winding system for such electrically powered vehicles (e.g. LHD machines and dumpers) and working machines which operate in cramped underground conditions like mines and tunnels and which receive their driving power through a flexible cable.

The main principle is to employ a rotating, axially vertical cable winding means, mounted on the center line of a vehicle, and a guide means is disposed at the end of an extension arm journalled concentrically therewith, the moment which effects winding of the cable acts between the extension arm and winding means.

Due to e.g. exhaust gas problems, the present tendency in the field of transport, loading and similar vehicles and machines working in underground conditions is to replace diesel power by electric power. This development has been slowed down by problems, caused by a cable link required between a vehicle and stationary electric mains, e.g. by a restricted operating range, by the short service life of a cable, as well as by a substantial demand for space of a cable drum. The prior art winding systems do not permit satisfactory driving past the cable connection point and, therefore, in a tunnel or passage it is often a must to operate in just one direction from the connection point. This means a double cable length, as compared to the situation where the connection point would be located at the midway point of an operating range.

The prior winding systems employ a vehicle having a rear portion on which is mounted a horizontal drum for winding thereon a cable of circular cross section but the empty interior of such a drum is wasted space. This system requires a lot of space, but the empty interior of such a drum is wasted space. A cable is usually passed on to the drum through a port defined by four crosswise arranged rollers; the port is connected to the rider of a parallel winding means when using a wide drum. Even in the case of straight forward driving the cable falls down into a pattern of wavy lines. The cable extends from a vehicle in straight rearward direction and every change of a driving angle bends a cable by the radius of said port rollers which is inevitably rather small relative to the diameter of a cable. A tolerable mode of driving past the connection point has been attempted by providing the rear corners of a vehicle with tall vertical rollers which steer the cable along the side of a vehicle. For practical reasons, these rollers have also small diameters and damage a cable, and they are not capable of displacing a cable to a safe distance from the side of a vehicle.

Prior known is also a system in which a cable is collected by means of a rotating guide arm within a kind of vertically disposed barrel. The practical application of this system is difficult because of its complicated structure and operating principle leading to twists and tangles in a cable.

DESCRIPTION OF THE INVENTION

An object of the invention is to provide a cable winding system which will overcome said drawbacks.

To achieve this object, a system according to the invention employs a cable collector (e.g. a reel or a disc) rotating on a vertical axle on which a cable of preferably flat crossection (a ribbon shape) is wound spirally, generally in a single layer. It is also possible to use a circular cable to be wound on several layers but some of the advantages of the invention will then be lost.

According to the invention, a cable is paid and fed from a vehicle through a guide means (e.g. a set of rollers) disposed at the end of an extension arm which is freely pivotable according to a given running direction of the cable and about a vertical axle concentric with said collector means. The fact that the extension arm and guide means are always aligned with the direction of traction decisively reduces vigorous bending of the cable. The turning sector can be limited so that, in its extreme positions, the extension arm points sideways. The length of an extension arm is suitable such that, in said extreme positions, the cable exit point is situated outside the sideline of a vehicle. The direction of incidence of a cable can then be from the front side of a vehicle and driving past the connection points in safe even in limited spaces. The free pivoting of an extension arm to the incoming direction of a cable is achieved according to the basic conception of the invention by connecting a winding moment so as to act between the extension arm and the collector means, as subsequently further described. Specifically a motor is mounted on a shaft or axle for the extension arm and is drivingly connected to a concentric drive axle for the cable collector.

The guide means is fitted in a manner that a flat cable is only forced to bend about its wide face which means that even small bending radii are possible without damaging the cable. Upon using a flat cable, the internal diameter of a cable collector and, thus, the resulting waste volume can be rather small. Even with a circular cable, it is advantageous to position a rather flat, axially vertical reel on the bottom of a vehicle and exploitation of the spaces above is apt to reduce the external dimensions of a vehicle.

DESCRIPTION OF THE DRAWINGS

The invention and one of its embodiments will now be described in more detail with reference to the accompanying schematic drawings in which.

Figure 1:
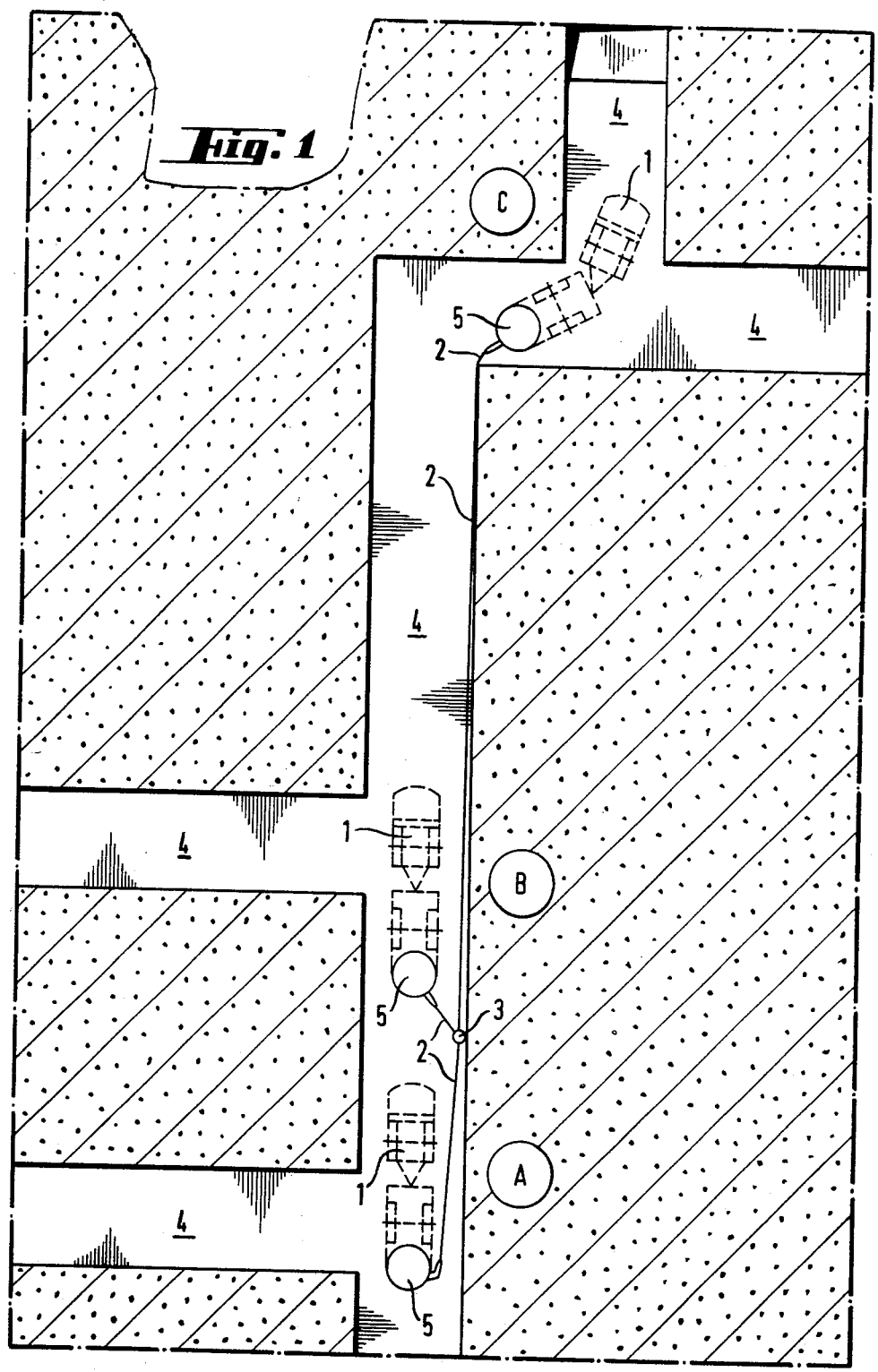
FIG. 1 is a plan view of the operating of a loader equipped with a system of the invention in a mine tunnel.

A general operation of the system is illustrated in FIG. 1 wherein a mine loader vehicle 1 is shown in dash lines, as it passes through a tunnel 4 in sequential positions. The vehicle passes the connection point 3 of a cable 2 when moving in the mine tunnel 4 from station A to station B. A winding system 5, mounted on the rear portion of a loader 1 and illustrated in solid line, maintains a cable 2 all the time in appropriate tension to avoid entanglement. In station A the direction of incidence of cable 2 is towards the front side of loader 1 and the exit point of cable 2 from a winding 5 lies outside the sideline of loader 1. Cable 2 cannot come in contact with any component of loader 1 and thus it cannot be damaged. Stations B and C illustrated how cable 2, when coming in from the rear sector, always runs in radial direction towards the same point on the center line of loader 1.

Figure 2:
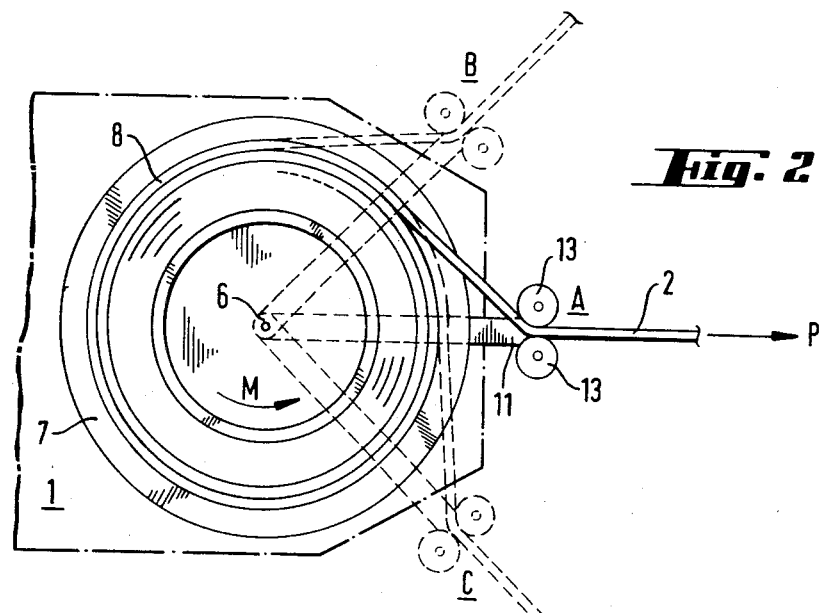
FIG. 2 is a plan view of the disposition of the basic components of a system of the invention
Figure 3:
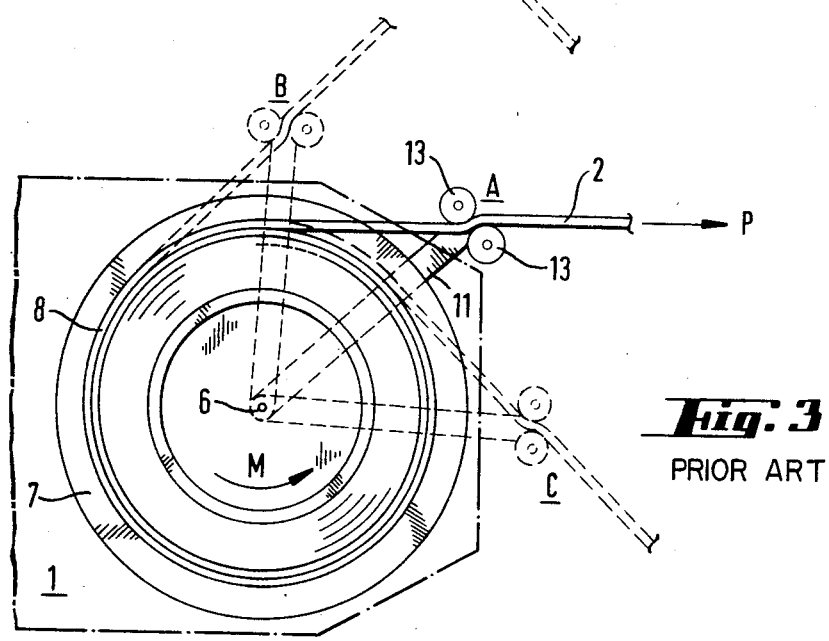
FIG. 3 shows a corresponding system in which the invention has not been applied.

The basic concept of the invention is illustrated in FIG. 2 depicting operation of a system of the invention to be compared with FIG. 3 which illustrates the operation of a prior art system comprising many similar components but being assembled in a different manner. A cable collector means 7 is dispossed on the center line of a loader 1 and rotates about a vertical axle 6. The collector means comprises a reel 8 upon which cable 2 is wound and is acted upon a winding moment designated by arrow M. Cable 2 exits from vehicle 1 in the direction of traction P through a guide means 13 mounted on the end of an extension arm 11. The arm 11 is journalled concentrical to the collector means but is mounted to the vehicle separately therefrom. The position of the extension arm 11 in relation to the direction of incidence of the cable directly from behind a vehicle is designated by letter A, while two other directions of incidence are designated by letters B and C.

In FIG. 2, the winding moment M according to the invention acts between collector means 7 and extension arm 11, in that a reeling and winding motor 10 is mounted on a hollow shaft or axle from which arm 11 extends and swivels therewith, while the axle 6 is the drive shaft of the motor 10 for driving the disk 7. Thus, the entire assembly is capable of rotating relative to vehicle 1 around the axis of axle 6, so that the counter-reaction to the traction force P of cable 2 is a force applied to axle 6 and acts in the opposite direction on the same straight line in horizontal plane. With a guide means 13 also positioned on the same straight line, cable 2 is always directed to the same point 6 on the center line of a vehicle.

In FIG. 3, the winding moment acts conventionally between collector means 7 and loader 1. An extension arm 11, together with its guide means 13, is also conventionally journalled to be freely pivotable relative to both collector means 7 and vehicle 1. Cable 2 leaves a reel 8 tangentially in the direction of traction P since extension arm 11 is perfectly freely pivoting and does not force cable 2 to change its angle. The counter-reaction to cable traction P is provided by a support force and moment acting on axle 6 and, thus, extension arm 11 is never aligned with the direction of traction. In a plurality of on-ground applications (lawn mowers etc.) this is not of substantial significance. However, the drawbacks are pronounced in mine loaders wherein the diameter of a completed reel nearly corresponds to the width of a vehicle. A cable exiting from the side of a machine is more susceptible to damage and an asymmetrical exit point, which varies according to the size of a reel, complicates the driving in narrow mine tunnels.

Figure 4:
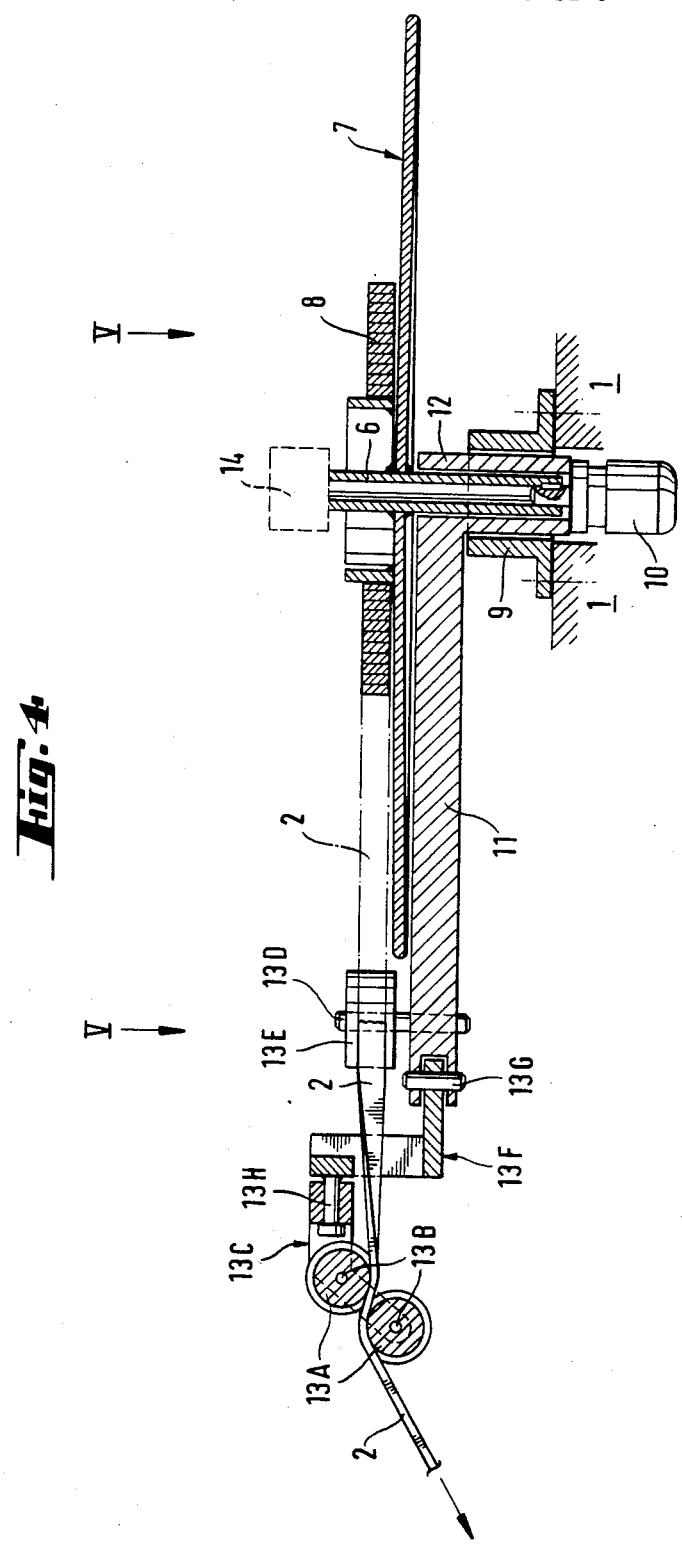
FIG. 4 illustrates an embodiment of the invention in lateral section.
Figure 5:
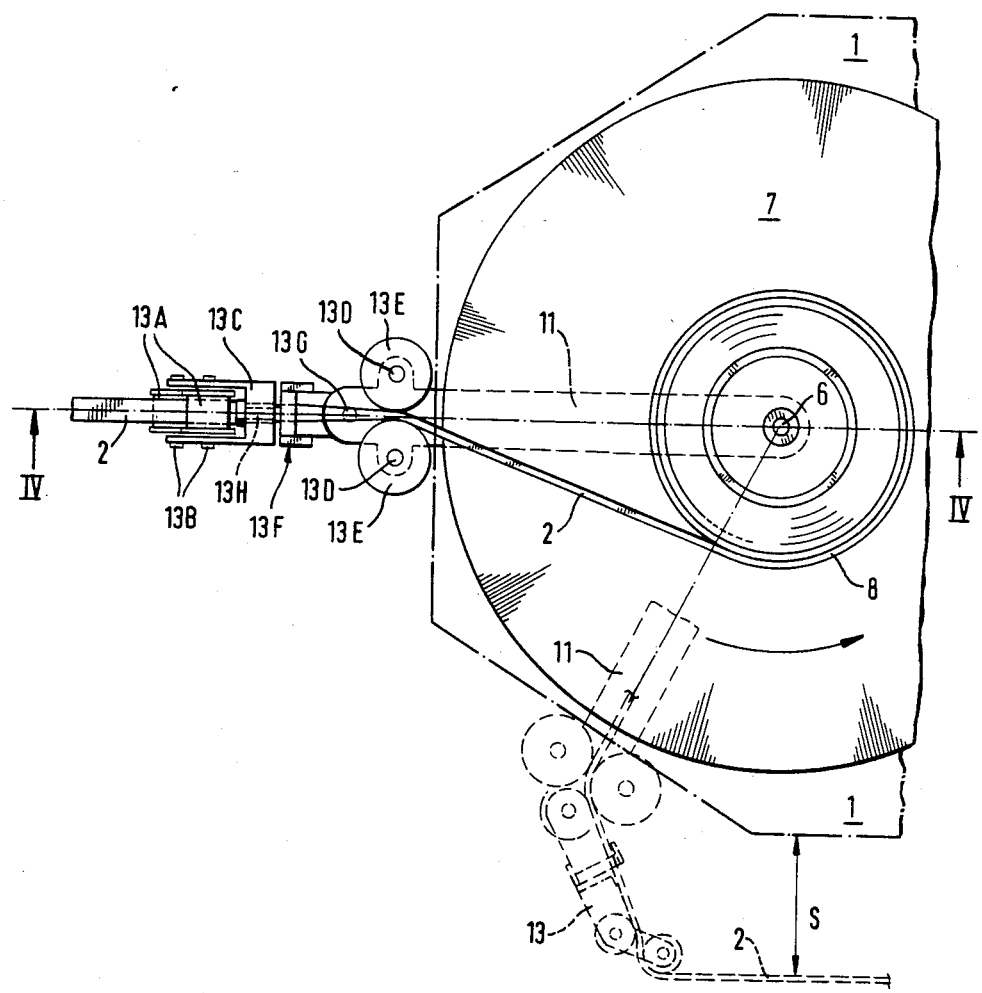
FIG. 5 shows the embodiment of FIG. 4 in plan view.

In the embodiment of FIGS. 4 and 5, showing details of the device of FIG. 2, a flat cable 2 is wound into a spiral reel or coil 8 on a plate-shaped collector means 7 rotating on a vertical axle 6, the winding is obtained through a guide means 13 mounted on the end of the extension arm 11. An outlet of electric power is provided on the top end of axle 6. This outlet is provided with a slide ring assembly 14 shown in dash lines. Arm 11 extends from a hollow shaft for being journalled therewith concentrically with collector means 7 in a manner that the hollow axle 12 of extension arm 11 acts as a bearing for the axle 6 of said collector means 7. Axle 12 is supported by a bearing 9 mounted on the fixed structure of a loader 1, shown by inclined ruling. A guide means and structure 13 at the tip of the extension arm 11 comprises a roller pair 13E respectively journalled on vertical axles 13D which in turn are fixedly connected to extension arm 11. The guide structure 13 includes another roller pair 13A with its axles 13B and guide block 13C connected by means of a crosslever 13F. The cross-lever 13F is capable of pivoting at the tip of extension arm 11 upon a vertical axle 13G disposed adjacent to rollers 13D. Guide block 13C, in turn, rotates on a horizontal axle 13H connected to cross-lever 13F. The pivoting angle of both extension arm 11 and cross-lever 13F is in a horizontal plane and is limited in a manner that, if turned to the right, they will be in the extreme position designated in FIG. 5 by dash lines. If the direction of incidence of cable 2 runs directly from the side of loader 1, the exit point of said cable will be at a distance S from the side of loader 1.

By virtue of the above-explained construction of guide means 13, a flat cable 2 is only forced to bend about its cross-sectionally wide face. The winding and tightening of cable 2 is effected by means of e.g. the hydraulically driven motor 10 which, as stated earlier, is mounted on the hollow axle 12 of extension arm 11 and drives directly the collector axle 6. The direction of winding moment is shown in FIG. 5 by an arrow. The entire system makes up a single unit capable of free rotation on a vertical bearing 9 disposed on the center line of loader 1. Thus, the only external force, traction of a cable, always turns the extension arm 11 and its guide means 13 into the direction of incidence of cable 2, since a corresponding support force acts on the fulcrum and thus cannot produce a moment. For uniform tension of a cable, the motor 10 can be fitted with equipment which automatically controls the winding moment according to a given diameter of cable reel 6.

FIG. 5 also illustrates that, by virtue of the concentric journalling of collector means 7 and extension arm 11, said extension arm 11 stays even during its swinging movement substantially within the outline of vehicle 1. Hence, the extending portion of a system, which is susceptible to damage and whose length is primarily determined by dimension S, can be rather short.

The invention is not limited to the described embodiment but modifications and variations can be made thereto within the scope of the appended claims.

I claim:
1. A cable winding system for electrically powered vehicles or working machines operating in cramped underground conditions and receiving its driving power through a flexible cable, the effective length of the cable depending on a given position of said vehicle the cable being wound onto an assembly mounted on said vehicle, whereby said cable is wound on a collector means rotating around a vertical axle disposed on the center line of vehicle and wherein a final exit point for the cable relative to said vehicle is determined by a guide means mounted on the end of an extension arm (11) swivelling concentrically to an axle (6) of said collector means said arm and said axle being pivotally relative to each other accordingly, the improvement comprising, the extension arm and the collector means forming an assembly being also jointly rotatable relative to the vehicle; and a drive means attached to an axle of the extension arm for swivelling therewith and being operatively drivingly connected to the axle of the collector means to drive said collector means.

2. A system as set forth in claim 1, the cross-section of said cable being flat.

3. A system as set forth in claim 1 including for limiting swivelling of said extension arm.

4. A system as set forth in claim 1, characterized in that said guide means is pivotable relative to said extension arm.

* * * * *